United States Patent
Koh et al.

(10) Patent No.: US 9,070,951 B2
(45) Date of Patent: Jun. 30, 2015

(54) SOLVENT FOR NONAQUEOUS ELECTROLYTE SOLUTION OF LITHIUM SECONDARY BATTERY

(75) Inventors: Meiten Koh, Settsu (JP); Akiyoshi Yamauchi, Settsu (JP); Akinori Tani, Settsu (JP); Hideo Sakata, Settsu (JP); Hitomi Nakazawa, Settsu (JP); Toshiki Ichisaka, Settsu (JP); Hiroyuki Arima, Settsu (JP); Tomoyo Sanagi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 574 days.

(21) Appl. No.: 13/496,971

(22) PCT Filed: Sep. 17, 2010

(86) PCT No.: PCT/JP2010/066177
§ 371 (c)(1),
(2), (4) Date: Mar. 19, 2012

(87) PCT Pub. No.: WO2011/034162
PCT Pub. Date: Mar. 24, 2011

(65) Prior Publication Data
US 2012/0183867 A1      Jul. 19, 2012

(30) Foreign Application Priority Data

Sep. 18, 2009   (JP) ................................. 2009-217857

(51) Int. Cl.
*H01M 4/58* (2010.01)
*H01M 6/16* (2006.01)
(Continued)

(52) U.S. Cl.
CPC .......... *H01M 10/0569* (2013.01); *H01M 6/166* (2013.01); *H01M 6/162* (2013.01);
(Continued)

(58) Field of Classification Search
CPC ......... H01M 6/14; H01M 6/16; H01M 6/162; H01M 6/166; H01M 6/168

USPC ............................................. 429/326, 231.95
See application file for complete search history.

(56) References Cited

U.S. PATENT DOCUMENTS

| 6,180,800 B1 * | 1/2001 | Yokoyama et al. ........... 549/229 |
| 2007/0154810 A1 * | 7/2007 | Kim et al. .................. 429/231.8 |

(Continued)

FOREIGN PATENT DOCUMENTS

| CN | 101388475 A | 3/2009 |
| CN | 101471457 A | 7/2009 |

(Continued)

OTHER PUBLICATIONS

International Search Report for PCT/JP2010/066177 dated Nov. 22, 2010.

*Primary Examiner* — Patrick Ryan
*Assistant Examiner* — Julian Anthony
(74) *Attorney, Agent, or Firm* — Sughrue Mion, PLLC

(57) ABSTRACT

The present invention provides a solvent for a nonaqueous electrolyte solution enabling a lithium secondary battery to exhibit an excellent discharge capacity, load characteristics, and cycle characteristics even under high voltages, as well as a nonaqueous electrolyte solution that uses this solvent and a lithium secondary battery. This solvent for a nonaqueous electrolyte solution is a solvent for a nonaqueous electrolyte solution for a lithium secondary battery, wherein the solvent for a nonaqueous electrolyte solution contains a fluorine-free cyclic carbonate (I), a fluorine-free chain carbonate (II), and a 1,1-di(fluorinated alkyl)ethylene carbonate (III), and wherein with a sum of (I), (II), and (III) being 100 volume %, the fluorine-free cyclic carbonate (I) is 10 to 50 volume %, the fluorine-free chain carbonate (II) is 49.9 to 89.9 volume %, and the 1,1-di(fluorinated alkyl)ethylene carbonate (III) is from at least 0.1 volume % to not more than 30 volume %.

8 Claims, 1 Drawing Sheet

(51) Int. Cl.
- *H01M 10/0569* (2010.01)
- *H01M 10/052* (2010.01)
- *H01M 6/14* (2006.01)

(52) U.S. Cl.
CPC ............... *H01M 6/14* (2013.01); *H01M 6/16* (2013.01); *H01M 10/052* (2013.01); *H01M 2300/0025* (2013.01); *Y02E 60/122* (2013.01); *Y02T 10/7011* (2013.01)

(56) References Cited

U.S. PATENT DOCUMENTS

| | | | |
|---|---|---|---|
| 2008/0090153 A1* | 4/2008 | Kim et al. | 429/332 |
| 2009/0068565 A1 | 3/2009 | Lee | |
| 2009/0169985 A1 | 7/2009 | Yamaguchi et al. | |
| 2009/0226807 A1 | 9/2009 | Nakamura | |
| 2010/0099031 A1 | 4/2010 | Kato et al. | |

FOREIGN PATENT DOCUMENTS

| | | |
|---|---|---|
| JP | 08-306364 A | 11/1996 |
| JP | 2000-188128 A | 7/2000 |
| JP | 2000-195544 A | 7/2000 |
| JP | 2003-317800 A | 11/2003 |
| JP | 2006-294414 A | 10/2006 |
| JP | 2007-188873 A | 7/2007 |
| JP | 2007-250415 A | 9/2007 |
| JP | 2008-108689 A | 5/2008 |
| JP | 2008-269978 A | 11/2008 |
| JP | 2009-110886 A | 5/2009 |
| JP | 2009-212001 A | 9/2009 |

* cited by examiner

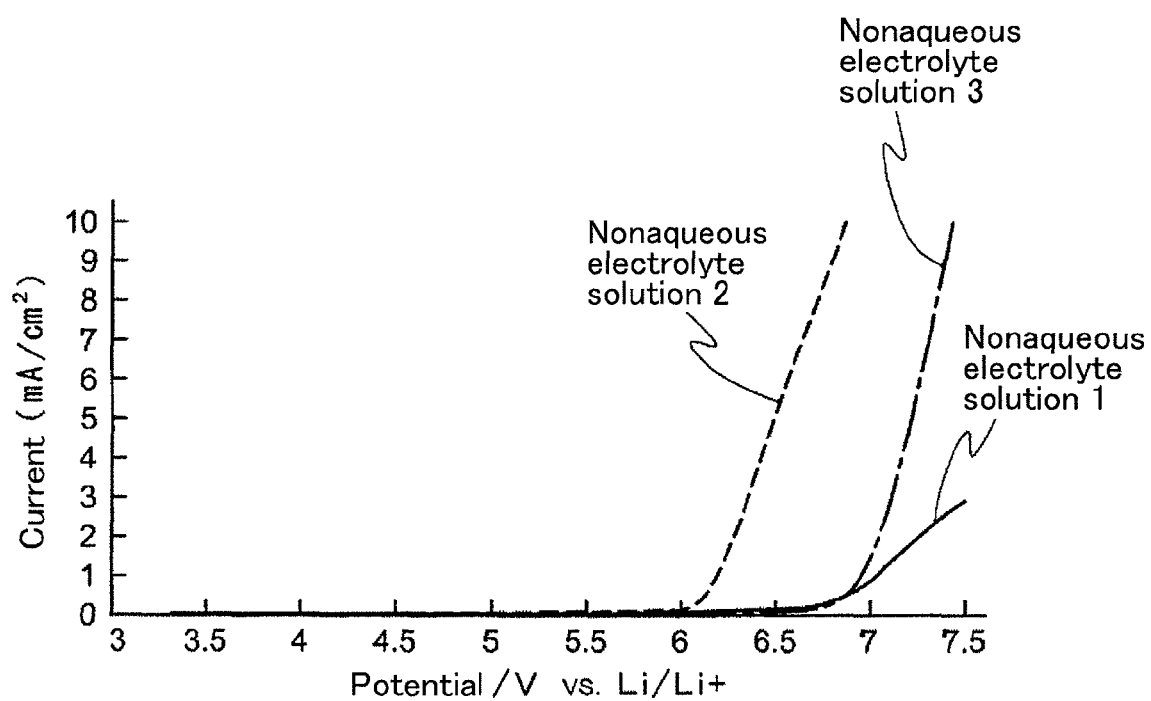

SOLVENT FOR NONAQUEOUS ELECTROLYTE SOLUTION OF LITHIUM SECONDARY BATTERY

CROSS REFERENCE TO RELATED APPLICATIONS

This application is a National Stage of International Application No. PCT/JP2010/066177 filed Sep. 17, 2010, claiming priority based on Japanese Patent Application No. 2009-217857 filed Sep. 18, 2009, the contents of all of which are incorporated herein by reference in their entirety.

TECHNICAL FIELD

The present invention relates to a solvent for a nonaqueous electrolyte solution for a lithium secondary battery, to a nonaqueous electrolyte solution that contains this solvent, and to a lithium secondary battery that uses this nonaqueous electrolyte solution.

BACKGROUND ART

The properties required of the nonaqueous electrolyte solutions used in lithium secondary batteries have become more and more rigorous with each passing year. The desire for an electrolyte solution that can be used at high voltages reflects one such property requirement.

As a method that solves this problem, the use of a fluorinated ethylene carbonate (EC) as a component of the solvent for the nonaqueous electrolyte solution has been proposed in order to increase oxidation resistance, inhibit dendrite formation, and improve the battery characteristics at high voltages (Patent References 1 to 7).

These patent references disclose the following as the fluorinated ethylene carbonate: fluoroethylene carbonates provided by replacing the hydrogen in ethylene carbonate with fluorine, e.g., monofluoroethylene carbonate (FEC) and di- to tetrafluoroethylene carbonates; mono(fluoroalkyl) substitutes for ethylene carbonate, e.g., monotrifluoromethylethylene carbonate ($CF_3EC$), mono(fluoroalkyl)ethylene carbonates ($RfCH_2$-EC and $Rf_2CH$-EC), and monofluoroalkyl ether ethylene carbonates ($RfCH_2OCH_2$-EC); and 1,2-di(fluoroalkyl) substitutes for ethylene carbonate, e.g., 1,2-ditrifluoromethylethylene carbonate.

Patent Reference 1: Japanese Patent Application Laid-open No. 2008-108689
Patent Reference 2: Japanese Patent Application Laid-open No. 2009-110886
Patent Reference 3: Japanese Patent Application Laid-open No. 2007-250415
Patent Reference 4: Japanese Patent Application Laid-open No. 2006-294414
Patent Reference 5: Japanese Patent Application Laid-open No. 2000-195544
Patent Reference 6: Japanese Patent Application Laid-open No. 2007-188873
Patent Reference 7: Japanese Patent Application Laid-open No. H8-306364

DISCLOSURE OF THE INVENTION

However, FEC and difluoroethylene carbonate are poorly resistant to moisture (are easily hydrolyzed), while $CF_3$-EC, although having a high oxidation resistance, also has a high viscosity. The mono(fluoroalkyl)-substituted ethylene carbonates such as $RfCH_2$-EC and $RfCH_2OCH_2$-EC have an even higher viscosity due to the presence of an alkyl group adjacent to the carbon in EC, while the di(fluoroalkyl)-substituted ethylene carbonates such as 1,2-ditrifluoromethylethylene carbonate have a low reduction potential. As a consequence of these problems, there continues to be demand for further improvements in the battery characteristics of lithium secondary batteries, e.g., the discharge capacity, load characteristics, and cycle characteristics, at even higher voltages.

The present inventors discovered that, among fluorinated alkyl substitutes, 1,1-di(fluorinated alkyl)ethylene carbonates are uniquely resistant to hydrolysis and that a lithium secondary battery fabricated using an electrolyte solution solvent that contains a 1,1-di(fluorinated alkyl)ethylene carbonate in specific proportions can secure stable battery characteristics even when used at high voltages. The present invention was achieved based on these discoveries.

An object of the present invention is to provide a solvent for nonaqueous electrolyte solutions wherein the solvent can provide a lithium secondary battery that exhibits an excellent discharge capacity, excellent load characteristics, and excellent cycle characteristics even at high voltages. Further objects of the present invention are to provide a nonaqueous electrolyte solution that uses this solvent and a lithium secondary battery.

The present invention relates to a solvent for a nonaqueous electrolyte solution for a lithium secondary battery, this solvent containing a fluorine-free cyclic carbonate (I), a fluorine-free chain carbonate (II), and a 1,1-di(fluorinated alkyl) ethylene carbonate (III), and wherein with a sum of (I), (II), and (III) being 100 volume %, the fluorine-free cyclic carbonate (I) is 10 to 50 volume %, the fluorine-free chain carbonate (II) is 49.9 to 89.9 volume %, and the 1,1-di(fluorinated alkyl)ethylene carbonate (III) is from at least 0.1 volume % to not more than 30 volume %.

From the standpoint of obtaining excellent cycle characteristics, the fluorine-free cyclic carbonate (I) is preferably ethylene carbonate, propylene carbonate, or a mixture thereof.

From the standpoint of obtaining excellent load characteristics, at least one selection from the group consisting of dimethyl carbonate, methyl ethyl carbonate, and diethyl carbonate is preferred for the fluorine-free chain carbonate (II).

The 1,1-di(fluorinated alkyl)ethylene carbonate (III) is preferably 1,1-ditrifluoromethylethylene carbonate from the standpoint of obtaining a low viscosity.

The electrolyte is more resistant to degradation when the water content of the 1,1-di(fluorinated alkyl)ethylene carbonate (III) is not more than 40 ppm, and this is therefore preferred.

Viewed from the perspective of obtaining excellent low-temperature characteristics, the proportions for components (I), (II), and (III)—with a sum of components (I), (II), and (III) being 100 volume %—are preferably 10 to 40 volume % for the fluorine-free cyclic carbonate (I), 59.9 to 89.9 volume % for the fluorine-free chain carbonate (II), and from at least 0.1 volume % to not more than 10 volume % for the 1,1-di (fluorinated alkyl)ethylene carbonate (III).

The present invention also relates to a nonaqueous electrolyte solution for a lithium secondary battery, wherein the nonaqueous electrolyte solution includes an electrolyte salt and the previously described solvent for a nonaqueous electrolyte solution.

The present invention also relates to a lithium secondary battery that uses the nonaqueous electrolyte solution of the present invention.

According to the present invention, a 1,1-di(fluorinated alkyl)ethylene carbonate (III) is uniquely resistant to hydrolysis and the co-use of this 1,1-di(fluorinated alkyl) ethylene carbonate (III) at prescribed proportions with a fluorine-free cyclic carbonate (I) and a fluorine-free chain carbonate (II) can provide a nonaqueous electrolyte solution solvent that yields a lithium secondary battery that characteristically exhibits an excellent discharge capacity and excellent load and cycle characteristics. The present invention additionally provides an electrolyte solution that uses this solvent and a lithium secondary battery.

BRIEF DESCRIPTION OF THE DRAWING

FIG. 1 is an LSV chart of the electrolyte solutions measured in Measurement Example 1.

MODES FOR CARRYING OUT THE INVENTION

The solvent of the present invention for use in a nonaqueous electrolyte solution contains fluorine-free cyclic carbonate (I), fluorine-free chain carbonate (II), and 1,1-di(fluorinated alkyl)ethylene carbonate (III) in specific proportions.

Each of these components and their proportion of incorporation are described below.

(I) The Fluorine-Free Cyclic Carbonate

The fluorine-free cyclic carbonate (I) can be exemplified by one or more selections from ethylene carbonate, propylene carbonate, butylene carbonate, vinylethylene carbonate, and so forth. Ethylene carbonate (EC) and propylene carbonate (PC) are preferred for the electrolyte solutions of the present invention for their high dielectric constants and their particularly good capacity to dissolve electrolyte salts.

In addition to having an excellent ability to dissolve electrolyte salts, this fluorine-free cyclic carbonate has the ability to improve the load characteristics and the ability to raise the dielectric constant.

In addition, vinylene carbonate may also be incorporated as an auxiliary (optional) component because it improves the cycle characteristics, although it does lower the discharge capacity. Its quantity of incorporation is desirably 0.1 to 10 volume % with reference to the electrolyte solution as a whole.

(II) The Fluorine-Free Chain Carbonate

The fluorine-free chain carbonate (II) can be exemplified by one or more selections from hydrocarbon-type chain carbonates, such as $CH_3CH_2OCOOCH_2CH_3$ (diethyl carbonate, DEC), $CH_3CH_2OCOOCH_3$ (methyl ethyl carbonate, MEC), $CH_3OCOOCH_3$ (dimethyl carbonate, DMC), $CH_3OCOOCH_2CH_3$ (methyl propyl carbonate). Among the preceding, DEC, MEC, and DMC are preferred because they provide a low viscosity and excellent low-temperature characteristics.

(III) The 1,1-di(fluorinated alkyl)ethylene carbonate

The 1,1-di(fluorinated alkyl)ethylene carbonate (III), while residing in the category of fluorine-containing ethylene carbonates, is an ethylene carbonate that has two fluorinated alkyl groups substituted at position 1 and is also known as a 4,4-bis(fluorinated alkyl)-1,3-dioxolan-2-one.

The two fluorinated alkyl groups may be the same as each other or may differ from one another. $C_{1-3}$ fluorinated alkyl groups, e.g., $CH_2F$, $CHF_2$, $CF_3$, $CH_2FCH_2$, $CHF_2CH_2$, $CF_3CH_2$, $CH_2FCFH$, $CHF_2CFH$, $CF_3CFH$, $CH_2FCF_2$, $CHF_2CF_2$, $CF_3CF_2$, $CF_3CF_2CF_2$, and so forth, are preferred for the fluorinated alkyl group from the standpoint of obtaining a low viscosity.

Specific examples are 1,1-ditrifluoromethylethylene carbonate (4,4-bis-trifluoromethyl-[1,3]dioxolan-2-one), 1,1-dipentafluoroethylethylene carbonate (4,4-bis-pentafluoroethyl-[1,3]dioxolan-2-one), 1-trifluoromethyl-1-pentafluoroethylethylene carbonate (4-pentafluoroethyl-4-trifluoromethyl-[1,3]dioxolan-2-one), and so forth, whereamong 1,1-ditrifluoromethylethylene carbonate is particularly preferred from the standpoint of obtaining a low viscosity.

The 1,1-di(fluorinated alkyl)ethylene carbonates (III) have a higher resistance to oxidation than analogous fluorine-containing ethylene carbonates such as the monofluoroethylene carbonates, e.g., monofluoroethylene carbonate and dialkylmonofluoroethylene carbonates, and thus provide a characteristically better discharge capacity, load characteristic, cycle characteristic, and reduction in resistance for the lithium secondary battery at high voltages. In addition, the 1,1-di(fluorinated alkyl)ethylene carbonates (III) are more resistant to hydrolysis than difluoroethylene carbonates, e.g., difluoroethylene carbonate and difluoromonoalkylethylene carbonates, and thus again provide a characteristically better discharge capacity, load characteristic, cycle characteristic, and reduction in internal resistance for the lithium secondary battery at high voltages.

Moreover, the 1,1-di(fluorinated alkyl)ethylene carbonates (III) have a lower reduction potential than structural isomers such as 1,2-ditrifluoromethylethylene carbonate, and thus are more resistant to degradation at the negative electrode and provide a characteristically better discharge capacity, load characteristic, improvement in the cycle characteristic, and reduction in internal resistance for the lithium secondary battery at high voltages.

The incorporation proportions, letting the sum of components (I), (II), and (III) be 100 volume %, are 10 to 50 volume % for the fluorine-free cyclic carbonate (I), 49.9 to 89.9 volume % for the fluorine-free chain carbonate (II), and from at least 0.1 volume % to not more than 30 volume % for the 1,1-di(fluorinated alkyl)ethylene carbonate (III).

When the content of the fluorine-free cyclic carbonate (I) is too large, the compatibility with other components declines and in particular layer separation from the other components may occur in a low-temperature atmosphere (for example, −30 to −20° C.), such as the outdoor temperature during the winter or the compartment temperature in a freezer. Viewed from this perspective, the upper limit is preferably 35 volume % and more preferably is 30 volume %. When, on the other hand, the content is too low, the solvent as a whole exhibits a reduced ability to dissolve electrolyte salts and the desired electrolyte concentration (at least 0.8 mole/liter) cannot be achieved.

In addition, the fluorine-free cyclic carbonate (I) is blended in a smaller amount than the fluorine-free chain carbonate (II) in order to avoid lowering the compatibility among the individual components of the solvent. In particular, when the sum of the fluorine-free cyclic carbonate (I) and the 1,1-di(fluorinated alkyl)ethylene carbonate (III) is an amount less than that of the fluorine-free chain carbonate (II), an electrolyte solution can be formed that is uniform over a broad temperature range because compatibility among the individual components of the solvent can be maintained; this is also preferred from the standpoint of improving the load and cycle characteristics of the lithium secondary battery.

The amount of incorporation for the 1,1-di(fluorinated alkyl)ethylene carbonate (III) is not more than 30 volume %. The discharge capacity presents a declining trend when too much component (III) is used, and its acceptable upper limit is 30 volume %. The effects provided by component (III) can be manifested at a relatively small amount thereof. Not more than 10 volume % is preferred. The effective lower limit is 0.1 volume % and 0.5 volume % is preferred.

It is believed that the 1,1-di(fluorinated alkyl)ethylene carbonate (III) in particular forms an excellent coating film on the negative electrode and lowers the resistance as a result. Accordingly, when a carbonaceous material such as graphite is used for the negative electrode, 5 volume % or less is particularly preferred. When a metal alloy material is used for the negative electrode, the large expansion and contraction requires a coating film that is more stable than for the carbonaceous material, and as a result not more than 20 volume % is preferred.

Taking into account the considerations given above and letting the sum of components (I), (II), and (III) be 100 volume %, a preferred solvent for the nonaqueous electrolyte solution contains 10 to 40 volume % of the fluorine-free cyclic carbonate (I), 59.9 to 89.9 volume % of the fluorine-free chain carbonate (II), and from at least 0.1 volume % to not more than 10 volume % of the 1,1-di(fluorinated alkyl) ethylene carbonate (III).

The solvent of the present invention for a nonaqueous electrolyte solution can solve the problems for the present invention with only components (I), (II), and (III), but in addition to components (I), (II), and (III) may also incorporate other solvents known as solvents for nonaqueous electrolyte solutions. Their type and amount of incorporation must be in a range that does not impair a solution to the problems for the present invention.

The present invention also relates to an electrolyte solution for a lithium secondary battery, wherein the electrolyte solution contains an electrolyte salt and the nonaqueous electrolyte solution solvent of the present invention.

The electrolyte salt used in the nonaqueous electrolyte solution of the present invention can be exemplified by $LiClO_4$, $LiAsF_6$, $LiBF_4$, $LiPF_6$, $LiN(SO_2CF_3)_2$, and $LiN(SO_2C_2F_5)_2$, wherein $LiPF_6$, $LiBF_4$, $LiN(SO_2CF_3)_2$, $LiN(SO_2C_2F_5)_2$, or a combination of the preceding is particularly preferred from the standpoint of obtaining excellent cycle characteristics.

In order to secure practical properties for the lithium ion secondary battery, the concentration of the electrolyte salt must be at least 0.5 mole/liter and preferably at least 0.8 mole/liter. The upper limit is ordinarily 1.5 mole/liter. The solvent of the present invention for nonaqueous electrolyte solutions has a solubilizing capacity that has been brought into a range that satisfies these requirements for the electrolyte salt concentration.

While keeping the volumetric ratio among components (I) to (III) intact, the nonaqueous electrolyte solution of the present invention may incorporate other additives within a range that does not impair the effects of the present invention, for example, flame retardants, surfactants, dielectric constant-boosting agents, agents that improve the cycle and load characteristics, and overcharge inhibitors when additional improvements in safety are sought.

The heretofore known flame retardants can be used for the flame retardant. In particular, a phosphate ester may be incorporated in order to impart noncombustibility (resistance to ignition). With regard to the quantity of incorporation, ignition can be prevented at from 1 to 10 volume % with reference to the solvent for the nonaqueous electrolyte solution.

The phosphate ester can be exemplified by fluorine-containing alkyl phosphate esters, fluorine-free alkyl phosphate esters, and aryl phosphate esters, wherein fluorine-containing alkyl phosphate esters are preferred because they have a strong ability to raise the noncombustibility of the electrolyte solution and because they improve the noncombustibility at small amounts of incorporation.

The fluorine-containing alkyl phosphate esters can be exemplified by the fluorine-containing dialkyl phosphate esters described in Japanese Patent Application Laid-open No. H11-233141, the cyclic alkyl phosphate esters described in Japanese Patent Application Laid-open No. H11-283669, and fluorine-containing trialkyl phosphate esters.

The fluorine-containing trialkyl phosphate esters can be used at small quantities of addition because they have a high capacity to provide the noncombustibility and because they also have an excellent compatibility with components (I) to (III), and they can prevent ignition at 1 to 8 volume % and even at 1 to 5 volume %.

In preferred fluorine-containing trialkyl phosphate esters, Rf in the formula $(RfO)_3-P=O$ is $CF_3-$, $CF_3CF_2-$, $CF_3CH_2-$, $HCF_2CF_2-$, or $CF_3CFHCF_2-$ wherein tri(2,2,3,3,3-pentafluoropropyl) phosphate and tri(2,2,3,3-tetrafluoropropyl) phosphate are particularly preferred.

Other examples of flame retardants are fluorine-containing carbonates (other than component (III)), fluorine-containing lactones, fluorine-containing sulfolanes, and fluorine-containing ethers. The fluorine-containing carbonate flame retardants can be exemplified by the fluorine-containing chain carbonates represented by

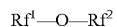

($Rf^1$ and $Rf^2$ may be the same as each other or may differ from one another and represent $C_{1-3}$ alkyl possibly containing the fluorine atom wherein at least one selection from $Rf^1$ and $Rf^2$ contains the fluorine atom) and by the fluorine-containing cyclic carbonates represented by

[Chem. 1]

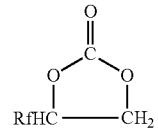

(Rf is a $C_{1-9}$ fluorine-containing alkyl group possibly containing an ether linkage).

The dielectric constant-boosting agent can be exemplified by sulfolane, methylsulfolane, γ-butyrolactone, γ-valerolactone, acetonitrile, and propionitrile. [0048]

The overcharge inhibitor can be exemplified by hexafluorobenzene, fluorobenzene, cyclohexylbenzene, dichloroaniline, difluoroaniline, and toluene.

Fluoroethylene carbonates as well as the previously mentioned vinylene carbonate are effective for improving the cycle characteristics, but do reduce the discharge capacity.

For example, tetrahydrofuran and silicate compounds are effective for improving the load characteristics.

The present invention also relates to a lithium secondary battery that uses the nonaqueous electrolyte solution of the present invention. The lithium secondary battery of the present invention includes a positive electrode, a negative electrode, a separator, and the electrolyte solution of the present invention. In particular, the positive electrode active material used for the positive electrode is preferably at least one lithium compound selected from the group consisting of cobalt-type composite oxides, nickel-type composite oxides, manganese-type composite oxides, iron-type composite oxides, and vanadium-type composite oxides because this provides a lithium secondary battery that has a high energy density and a high output.

The lithium compounds represented by the following formula (A) are examples of preferred positive electrode active materials. These are lithium-containing composite metal oxides represented by formula (A):

$$Li_xM^1{}_yM^2{}_{1-y}O_2$$

(in the formula, $0.4 \le x \le 1$; $0.3 \le y \le 1$; $M^1$ is at least one selection from the group consisting of Ni and Mn; and $M^2$ is at least one selection from the group consisting of Co, Al, and Fe).

Specifically, the following are preferred lithium-containing composite metal oxides:

$$LiNi_xCo_yAl_zO_2 \qquad \text{formula (A1)}:$$

(in the formula, $0.7 \le x \le 1$, $0 \le y \le 0.3$, $0 \le z \le 0.1$, and $0.9 \le x+y+z \le 1.1$);

$$LiNi_xCo_yMn_zO_2 \qquad \text{formula (A2)}:$$

(in the formula, $0.3 \le x \le 0.6$, $0 \le y \le 0.4$, $0.3 \le z \le 0.6$, and $0.9 \le x+y+z \le 1.1$);

$$Li_xMn_zO_2 \qquad \text{formula (A3)}:$$

(in the formula, $0.4 \le x \le 0.6$ and $0.9 \le z \le 1$); and $$LiFe_xCo_yMn_zO_2 \qquad \text{formula (A4)}:$$

(in the formula, $0.3 \le x \le 0.6$, $0.1 \le y \le 0.4$, $0.3 \le z \le 0.6$, and $0.9 \le x+y+z \le 1.1$).

Specific examples of lithium-containing composite metal oxides with formula (A1) are $LiNi_{0.8}Co_{0.2}O_2$, $LiNi_{0.7}Co_{0.3}O_2$, $LiNi_{0.82}Co_{0.15}Al_{0.03}O_2$, $LiNi_{0.7}Co_{0.2}Al_{0.1}O_2$, and $LiNi_{0.85}Co_{0.1}Al_{0.5}O_2$, whereamong $LiNi_{0.82}Co_{0.15}Al_{0.03}O_2$ (NCA) is preferred.

Specific examples of lithium-containing composite metal oxides with formula (A2) are $LiNi_{0.5}Mn_{0.5}O_2$, $LiNi_{0.75}Mn_{0.25}O_2$, $LiNi_{0.25}Mn_{0.75}O_2$, $LiNi_{1/3}Co_{1/3}Mn_{1/3}O_2$, $LiNi_{0.4}Co_{0.2}Mn_{0.4}O_2$, and $LiNi_{0.3}Co_{0.5}Mn_{0.2}O_2$ whereamong $LiNi_{1/3}Co_{1/3}Mn_{1/3}O_2$ (NCM) is preferred.

Specific examples of lithium-containing composite metal oxides with formula (A3) are $Li_{0.5}MnO_2$ (spinel manganese) and $LiMnO_2$.

Specific examples of lithium-containing composite metal oxides with formula (A4) are $LiFe_{1/3}Co_{1/3}Mn_{1/3}O_2$, $Li_{0.5}Fe_{1/3}Co_{1/3}Mn_{1/3}O_2$, $LiFe_{0.4}Co_{0.3}Mn_{0.3}O_2$, and $Li_{0.5}Fe_{0.4}Co_{0.3}Mn_{0.3}O_2$.

$LiCoO_2$, $LiNiO_2$, $LiMn_2O_4$, and so forth can also be used in addition to the preceding.

In the particular case in the present invention of application to a large-scale lithium secondary battery for service in a hybrid vehicle or in a distributed or decentralized power source, due to the requirement for a high output, the positive electrode active material particles are preferably mainly secondary particles, the average particle diameter of these secondary particles is preferably not more than 40 μm, and the positive electrode active material particles preferably contain from 0.5 to 7.0 volume % microparticles with an average primary particle diameter of not more than 1 μm.

The presence of microparticles with an average primary particle diameter of not more than 1 μm results in a large area of contact with the electrolyte solution, which in turn can speed up lithium ion diffusion between the electrodes and the electrolyte solution and can thereby improve the output performance.

The negative electrode active material used in the negative electrode in the present invention can be exemplified by carbonaceous materials and also by metal oxides and metal nitrides that are capable of incorporating the lithium ion. The carbonaceous material can be exemplified by natural graphite, artificial graphite, pyrolyzed carbons, cokes, mesocarbon microbeads, carbon fiber, active carbon, pitch-coated graphite, and so forth. Metal oxides capable of incorporating the lithium ion can be exemplified by metal compounds that contain tin, silicon, or titanium, e.g., tin oxide, silicon oxide, and lithium titanate, while the metal nitrides can be exemplified by $Li_{2.6}Co_{0.4}N$.

There are no particular limitations on the separators that can be used in the present invention, and this separator can be exemplified by microporous polyethylene film, microporous polypropylene film, microporous ethylene-propylene copolymer film, microporous polypropylene/polyethylene two-layer film, and microporous polypropylene/polyethylene/polypropylene three-layer film. Another example is a film provided by coating a separator with an aramid resin in order to prevent short circuiting and improve the safety.

The lithium secondary battery of the present invention is useful as a large-scale lithium secondary battery for application in hybrid vehicles or in a distributed or decentralized power source and is useful as a small-scale lithium secondary battery for portable phones, personal digital assistants, and so forth.

EXAMPLES

Next, the present invention is described using examples, but the present invention is not limited to just these examples.

The individual compounds used in the following examples and comparative examples are described below.

component (I)

(IA): ethylene carbonate (IB): propylene carbonate component (II)

(IIA): dimethyl carbonate (IIB): methyl ethyl carbonate (IIC): diethyl carbonate component (III)

(IIIA): 1,1-ditrifluoromethylethylene carbonate (IIIB): 1-trifluoromethyl-1-pentafluoroethylethylene carbonate component (IV)

(IVA): monofluoroethylene carbonate (IVB): 1,1-difluoroethylene carbonate (IVC): 1,2-ditrifluoromethylethylene carbonate The electrolyte salt (V)

(VA): $LiPF_6$ (VB): $LiN(O_2SCF_3)_2$ (VC): $LiN(O_2SC_2F_5)_2$ (VD): $LiBF_4$

The NMR and IR measurements were performed as follows.

(1) NMR instrument: AC-300 from BRUKER measurement conditions:

$^{19}$F-NMR: 282 MHz (trifluoromethylbenzene=−62.3 ppm)

$^1$H-NMR: 300 MHz (trifluoromethylbenzene=7.51 ppm)

(2) Infrared Spectroscopic Analysis (IR)

This measurement was taken at room temperature using a Model 1760X Fourier-transform infrared spectrophotometer from Perkin-Elmer.

(3) Measurement of the Amount of Water

This measurement was performed using a Karl-Fischer moisture titrator (MKC-501 from Kyoto Electronics Manufacturing Co., Ltd.)

Synthesis Example 1

Synthesis of 1,1-ditrifluoromethylethylene carbonate (4,4-bis-trifluoromethyl-[1,3]dioxolan-2-one)

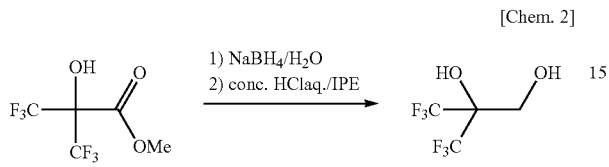

[Chem. 2]

A glass 3-L four-neck flask was fitted with a mechanical stirrer, a Dimroth condenser, and a dropping funnel. Operating at room temperature, 1 L of pure water was introduced into the reactor followed by the introduction of 69 g (1.93 mol) sodium tetrahydroborate and dissolution. To this was added dropwise 515 g (2.28 mol) 2-hydroxy-3,3,3-trifluoro-2-trifluoromethylpropionic acid methyl ester (MTTHP). Suitable cooling was performed with ice water during this period so as to prevent the liquid temperature from exceeding 50° C. After the dropwise addition of all of the MTTHP, stirring was performed for 1 hour at room temperature and quenching was carried out by the dropwise addition of 300 mL 35% aqueous hydrochloric acid into the reaction solution on an ice bath. The quenched solution was subjected to suction filtration to remove the salts produced during the reaction and the residual salt was washed twice with 500 mL isopropyl ether (IPE). The obtained filtrate was separated and the organic layer was recovered and the aqueous layer was extracted twice with 700 mL IPE. The organic layer and the extracts were combined and dried over magnesium sulfate; suction filtration was performed and the filtrate was recovered; and the IPE was removed by condensation on an evaporator. Simple distillation of the resulting solution under reduced pressure yielded 217 g (isolated yield=48%, purity=98%) 3,3,3-trifluoro-2-trifluoromethylpropane-1,2-diol.

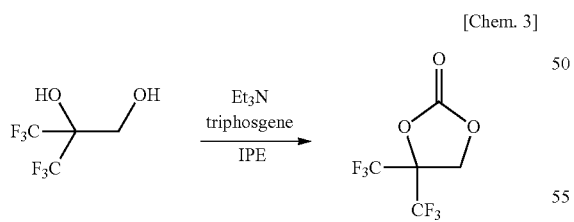

[Chem. 3]

A glass 1-L four-neck flask was fitted with a mechanical stirrer, a Dimroth condenser, and a dropping funnel. Operating on an ice bath, 400 mL IPE was introduced into the reactor; 133 g (0.45 mol) triphosgene was introduced and dissolved; and 222 g (1.71 mol) 3,3,3-trifluoro-2-trifluoromethylpropane-1,2-diol was introduced. 170 g (1.68 mol) triethylamine was then added dropwise and stirring was carried out for 1 hour at room temperature. Quenching was performed by introducing 600 mL pure water into the reaction solution; separation was carried out; the organic layer was washed with 600 mL 1 N aqueous hydrochloric acid followed by separation, washing with 600 mL pure water, and separation. Secado KW (Shinagawa Chemicals Co., Ltd.) and magnesium sulfate were introduced into the obtained organic layer to perform acid removal and drying. A filtrate was recovered by suction filtration and this was subjected to rectification at normal pressure using a 10-stage Oldershaw column to obtain 264 g (isolated yield=69%, purity=99.5%) 1,1-ditrifluoromethylethylene carbonate. Molecular Sieve 3A (Wako Pure Chemical Industries, Ltd.) was then introduced and the water content was reduced to 30 ppm.

$^{19}$F-NMR (CDCl$_3$:CFCl$_3$ reference): δ −77.29 ppm (s, 6F)
$^{1}$H-NMR (CDCl$_3$:TMS reference): δ 4.69 ppm (s, 2H)
IR: 1460 cm$^{-1}$ Synthesis Example 2

Synthesis of 1-trifluoromethyl-1-pentafluoroethyl-ethylene carbonate (4-pentafluoroethyl-4-trifluoromethyl-[1,3]dioxolan-2-one)

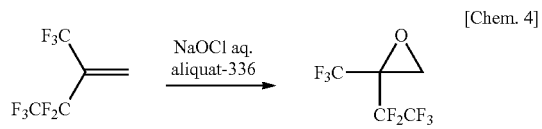

[Chem. 4]

A stirring bar was introduced into a 300-mL four-neck flask and the flask was fitted with a septum, Dimroth condenser, and dropping funnel. 100 mL pure water and 50 mL of a 50 mass % aqueous NaOH solution were introduced into the flask. The reaction solution was cooled to −5° C. and 15 g (211 mmol) chlorine gas was introduced with bubbling to prepare an NaOCl solution. 0.5 g (1.24 mmol) of the phase-transfer catalyst Aliquat 336 (Aldrich) was then introduced into this solution and the reaction solution was brought to 0° C. To this was added dropwise 52 g (244 mmol) 3,3,4,4,4-pentafluoro-2-trifluoromethylbutene and stirring was carried out until the starting olefin had disappeared. After the reaction was finished, the reaction solution was returned to room temperature and a cold trap was connected to the reactor. The pressure in the system was reduced and 2-pentafluoroethyl-2-trifluoromethyloxirane was recovered at the cold trap. The resulting solution was dried over magnesium sulfate; pressure filtration was carried out; and the filtrate was subjected to simple distillation to obtain 18 g of the target epoxide (isolated yield=32%, purity=98.4%).

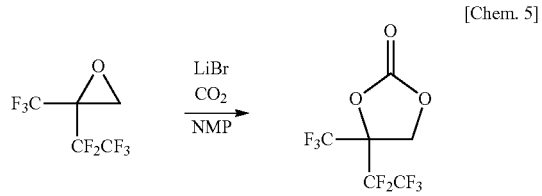

[Chem. 5]

73 mL N-methylpyrrolidone (NMP) was introduced into a 500-mL autoclave; 1.5 g (17 mmol) lithium bromide and 132 g (575 mmol) 2-pentafluoroethyl-2-trifluoromethyloxirane were charged; and the interior of the system was replaced with CO$_2$ 5 times. The reaction solution was heated to 100° C. and pressurization with CO$_2$ at 0.8 MPa was performed until the starting epoxide had disappeared. After the reaction was finished, the reaction solution was returned to room temperature; quenching was performed with 300 mL 1 N aqueous hydrochloric acid; separation was carried out and the organic layer was dried over magnesium sulfate; and suction filtration was performed. The filtrate was subjected to rectification under reduced pressure using a 10-stage Oldershaw column to obtain 113 g (isolated yield=72%, purity=99.7%) 1-trifluoromethyl-1-pentafluoroethylethylene carbonate (=4-pentafluoroethyl-4-trifluoromethyl-1,3-dioxolan-2-one). Molecular Sieve 3A (Wako Pure Chemical Industries, Ltd.) was then introduced and the water content was reduced to 30 ppm.

$^{19}$F-NMR (CDCl$_3$:CFCl$_3$ reference): δ −75.31 ppm (s, 3F), −86.22 ppm (s, 3F), −129.65 ppm (m, 1F), −131.27 ppm (m, 1F)

$^1$H-NMR (CDCl$_3$:TMS reference): δ 4.15 ppm (s, 2H) IR: 1463 cm$^{-1}$

Measurement Example 1

LSV Measurement

A nonaqueous electrolyte solution 1 for measurement was prepared by adding the electrolyte salt LiPF$_6$ at a concentration of 0.1 mole/liter to 5 mL 1,1-ditrifluoromethylethylene carbonate (IIIA) (30 ppm water content) and thoroughly stirring at 25° C.

For comparison, a comparative nonaqueous electrolyte solution 2 was prepared by adding the electrolyte salt LiPF$_6$ at a concentration of 0.1 mole/liter to 5 mL propylene carbonate (IB) and thoroughly stirring at 25° C.

A comparative nonaqueous electrolyte solution 3 was also prepared by adding the electrolyte salt LiPF$_6$ at a concentration of 0.1 mole/liter to 5 mL monofluoroethylene carbonate (IVA) and thoroughly stirring at 25° C.

(Construction of the Measurement Cell)

A measurement cell was constructed using a sealed voltammetric cell (VC-4) from BAS; using a platinum electrode for the working electrode and Li for the counter electrode and the reference electrode; and introducing 3 mL of the electrolyte solution for measurement. Using a potentio/galvanostat (Model 1287 from Solartron), this cell was scanned at 5 mV/sec from its spontaneous potential to 7.0 V at a constant 25° C. The results are given in FIG. 1.

FIG. 1 demonstrates that the potential of the onset of the sharp rise that indicates the start of electrolyte solution decomposition is higher for the electrolyte solution of Example 1 than for the electrolyte solutions of Comparative Examples 1 and 2 and also demonstrates that the electrolyte solution of Example 1 presents a gentler rate of decomposition and is thus is more resistant to oxidation.

Example 1

A nonaqueous electrolyte solution of the present invention was prepared by mixing ethylene carbonate (IA) as component (I), dimethyl carbonate (IIA) as component (II), and 1,1-ditrifluoromethylethylene carbonate (IIIA) (30 ppm water content) as component (III) at a volume % ratio of 30/67/3; adding LiPF$_6$ as the electrolyte salt at a concentration of 1.0 mole/liter to this nonaqueous electrolyte solution solvent; and thoroughly stirring at 25° C.

Example 2

A nonaqueous electrolyte solution of the present invention was prepared proceeding as in Example 1, but using 1-trifluoromethyl-1-pentafluoroethylethylene carbonate (IIIB) (30 ppm water content) as component (III).

Examples 3 to 8

Nonaqueous electrolyte solutions of the present invention were prepared as in Example 1 using the compounds and amounts shown in Table 1 for components (I), (II), and (III).

Examples 9 to 11

Nonaqueous electrolyte solutions of the present invention were prepared as in Example 1, but using the compounds and amounts shown in Table 2 for components (I), (II), and (III) and using LiN(O$_2$SCF$_3$)$_2$ (VB) (Example 9), LiN(O$_2$SC$_2$F$_5$)$_2$ (VC) (Example 10), or LiBF$_4$ (VD) (Example 11) instead of LiPF$_6$ (VA) as the electrolyte salt.

Examples 12 to 21

Nonaqueous electrolyte solutions of the present invention were prepared as in Example 1, but using the compounds and amounts shown in Table 2 for components (I), (II), and (III) and using LiPF$_6$ (VA) as the electrolyte salt.

Comparative Example 1

A comparative nonaqueous electrolyte solution was prepared proceeding as in Example 1, but using 30 volume % ethylene carbonate (IA) as a component (I) and 70 volume % diethyl carbonate (IIC) as a component (II) and omitting the addition of component (III).

Comparative Example 2

A comparative nonaqueous electrolyte solution was prepared proceeding as in Example 1, but using 30 volume % ethylene carbonate (IA) as a component (I), 67 volume % dimethyl carbonate (IIA) as a component (II), and 3 volume % monofluoroethylene carbonate (IVA) as a component (IV) and omitting the addition of component (III).

Comparative Example 3

A comparative nonaqueous electrolyte solution was prepared proceeding as in Example 1, but using 30 volume % ethylene carbonate (IA) as a component (I), 67 volume % dimethyl carbonate (IIA) as a component (II), and 3 volume % 1,1-difluoroethylene carbonate (IVB) as a component (IV) and omitting the addition of component (III).

Comparative Example 4

A comparative nonaqueous electrolyte solution was prepared proceeding as in Example 1, but using 10 volume % ethylene carbonate (IA) as a component (I), 59 volume % dimethyl carbonate (IIA) as a component (II), and 31 volume % 1,1-ditrifluoromethylethylene carbonate (IIIA) as a component (III).

Comparative Example 5

A comparative nonaqueous electrolyte solution was prepared proceeding as in Example 1, but using 30 volume % ethylene carbonate (IA) as a component (I), 67 volume % dimethyl carbonate (IIA) as a component (II), and 3 volume % 1,2-ditrifluoromethylethylene carbonate (IVC) as a component (IV) and omitting the addition of component (III).

The following Test 1 was performed on these nonaqueous electrolyte solutions.

Test 1 (Measurement of the battery characteristics)

Cylindrical secondary batteries were fabricated using the following procedure.

A positive electrode active material was prepared by mixing LiCoO$_2$, carbon black, and polyvinylidene fluoride (trade name: KF-1000, from Kureha Chemical Industry Co., Ltd.) at a mass % ratio of 90/3/7 and was dispersed in N-methyl-2-pyrrolidone to give a slurry. This slurry was uniformly coated on a positive electrode current collector (15 μm-thick aluminum foil) and was dried to form a positive electrode mixture layer. This was followed by compression molding using a roller press, cutting, and connection of a lead to produce a strip-form positive electrode.

Separately, a styrene-butadiene rubber dispersed in distilled water was added to an artificial graphite powder to provide a solids fraction of 6 mass %; this was mixed using a disperser to yield a slurry; and this slurry was uniformly coated on a negative electrode current collector (10 μm-thick copper foil) and dried to form a negative electrode mixture layer. This was followed by compression molding using a roller press, cutting, then drying, and connection of a lead to produce a strip-form negative electrode.

The strip-form positive electrode was stacked on the strip-form negative electrode with a 20 μm-thick microporous polyethylene film (separator) interposed therebetween and this assembly was wound into a spiral to give a layered electrode element having a spiral wound structure. This winding was carried out such that the rough side of the positive electrode current collector was positioned to the outside. This electrode element was then inserted into a cylindrical, closed-end battery case having an outer diameter of 18 mm and the leads for the positive electrode and negative electrode were connected.

An electrolyte solution as prepared in Examples 1 to 21 or Comparative Examples 1 to 5 was then filled into the battery case and the separator and so forth were thoroughly impregnated with the electrolyte solution. This was followed by sealing, pre-charging, and aging to give a cylindrical lithium secondary battery.

The discharge capacity and load and cycle characteristics of this lithium secondary battery were then investigated using the following procedures. The results are given in Tables 1 to 3.

(The Discharge Capacity)

Letting the charge-discharge current be represented by C, this measurement is performed using the following charge-discharge measurement conditions and using 1800 mA for 1C. The evaluation is carried out by indexing using the results for the discharge capacity in Comparative Example 1 as 100.

The charge-discharge conditions charging: hold 1.0 C and at 4.4 V until the charging current reaches $1/10$ C (CC-CV charging)

discharge: 1 C 3.0 V cut (CC discharge)

(The Load Characteristic)

The discharge capacity is determined by charging at 1.0 C and at 4.4 V until the charging current reaches $1/10$ C and by discharging to 3.0 V at a current corresponding to 0.2 C. The discharge capacity is then determined by charging at 1.0 C and at 4.4 V until the charging current reaches $1/10$ C and discharging to 3.0 V at a current corresponding to 2 C. The load characteristic is determined from the ratio between this discharge capacity at 2 C and the discharge capacity at 0.2 C by substitution into the following formula.

load characteristic(%)=2 C discharge capacity(mAh)/ 0.2 C discharge capacity(mAh)×100

(The Cycle Characteristic)

For the cycle characteristic, 1 cycle is taken to be a charge-discharge cycle performed using the previously described charge-discharge conditions (charging at 1.0 C and at 4.4 V until the charging current reaches $1/10$ C and discharging to 3.0 V at a current corresponding to 1 C), and the discharge capacity after the initial cycle and the discharge capacity after 100 cycles are measured. For the cycle characteristic, the value determined by the following formula is used as the cycle retention rate.

cycle retention rate(%)=100 cycle discharge capacity (mAh)/1 cycle discharge capacity(mAh)×100

TABLE 1

|  | Example 1 | Example 2 | Example 3 | Example 4 | Example 5 | Example 6 | Example 7 | Example 8 |
|---|---|---|---|---|---|---|---|---|
| Electrolyte solution Solvent composition Component (I) | | | | | | | | |
| Kinds | I A | I A | I A | I A | I A + I B | I A | I A | I A |
| Ratio (volume %) | 30 | 30 | 30 | 30 | 20 + 10 | 30 | 30 | 30 |
| Component (II) | | | | | | | | |
| Kinds | II A | II A | II B | II C | II A | II A + II B | II A + II C | II B + II C |
| Ratio (volume %) | 67 | 67 | 67 | 67 | 67 | 30 + 37 | 30 + 37 | 30 + 37 |
| Component (II) | | | | | | | | |
| Kinds | III A | III B | III A | III A | III A | III A | III A | III A |
| Ratio (volume %) | 3 | 3 | 3 | 3 | 3 | 3 | 3 | 3 |
| Total (volume %) | 100 | 100 | 100 | 100 | 100 | 100 | 100 | 100 |
| Component (V) electrolyte salt (Concentration mol/L) | | | | | | | | |
| (V A) LiPF$_6$ | 1.0 | 1.0 | 1.0 | 1.0 | 1.0 | 1.0 | 1.0 | 1.0 |
| Discharge capacity | 107.3 | 104.8 | 106.3 | 101.4 | 106.3 | 103.4 | 102.4 | 100.4 |
| Load characteristic (%) | 94.9 | 93.6 | 94.2 | 93.6 | 94.4 | 94.6 | 94.1 | 93.9 |
| Cycle characteristic (%) | 90.6 | 88.2 | 91.6 | 92.1 | 90.1 | 91.1 | 91.8 | 91.7 |

TABLE 2

| | Example 9 | Example 10 | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|---|
| Electrolyte solution Solvent composition Component (I) | | | | | | | | | | | | | |
| Kinds | I A | I A | I A | I A | I A | I A | I A | I B | I B | I A | I A | I A | I B |
| Ratio (volume %) | 30 | 30 | 30 | 30 | 10 | 35 | 20 | 30 | 30 | 20 | 20 | 35 | 30 |
| Component (II) | | | | | | | | | | | | | |
| Kinds | II A | II A | II A | II A | II A | II A | II A | II A | II A | II A + II B | II A + II B | II A + II B | II A + II C |
| Ratio (volume %) | 67 | 67 | 67 | 69.9 | 60 | 62 | 77 | 67 | 67 | 35 + 42 | 40 + 37 | 32 + 30 | 40 + 27 |
| Component (II) | | | | | | | | | | | | | |
| Kinds | III A | III A | III A | III A | III A | III A | III A | III A | III A | III A | III A | III A | III A |
| Ratio (volume %) | 3 | 3 | 3 | 0.1 | 30 | 3 | 3 | 3 | 3 | 3 | 3 | 3 | 3 |
| Total (volume %) | 100 | 100 | 100 | 100 | 100 | 100 | 100 | 100 | 100 | 100 | 100 | 100 | 100 |
| Component (V) electrolyte salt (Concentration mol/L) | | | | | | | | | | | | | |
| (V A) $LiPF_6$ | | | | 1.0 | 1.0 | 1.0 | 1.0 | 1.0 | 1.0 | 1.0 | 1.0 | 1.0 | 1.0 |
| (V B) $LiN(O_2SCF_3)_2$ | 1.0 | | | | | | | | | | | | |
| (V C) $LiN(O_2SC_2F_5)_2$ | | 1.0 | | | | | | | | | | | |
| (V D) $LiBF_4$ | | | 1.0 | | | | | | | | | | |
| Discharge capacity | 104.3 | 103.4 | 101.5 | 100.3 | 101.5 | 102.5 | 103.2 | 102.1 | 102.1 | 103.3 | 103.3 | 102.2 | 102.4 |
| Load characteristic (%) | 93.5 | 93.7 | 93.6 | 88.6 | 92.1 | 94.2 | 93.4 | 92.3 | 92.3 | 94.5 | 94.8 | 93.8 | 94.2 |
| Cycle characteristic (%) | 89.6 | 89.3 | 88.7 | 80.2 | 84.7 | 86.7 | 88.5 | 85.7 | 85.7 | 91.3 | 91.6 | 86.5 | 91.6 |

TABLE 3

| | Comparative Example1 | Comparative Example2 | Comparative Example3 | Comparative Example4 | Comparative Example5 |
|---|---|---|---|---|---|
| Electrolyte solution Solvent composition Component (I) | | | | | |
| Kinds | I A | I A | I A | I A | I A |
| Ratio (volume %) | 30 | 30 | 30 | 10 | 30 |
| Component (II) | | | | | |
| Kinds | II C | II A | II A | II A | II A |
| Ratio (volume %) | 70 | 67 | 67 | 59 | 67 |
| Component (III) | | | | | |
| Kinds | — | — | — | III A | — |
| Ratio (volume %) | — | — | — | 31 | — |
| Component (IV) | | | | | |
| Kinds | — | IVA | IVB | — | IVC |
| Ratio (volume %) | — | 3 | 3 | — | 3 |
| Total (volume %) | 100 | 100 | 100 | 100 | 100 |
| Component (V) electrolyte salt (Concentration mol/L) | | | | | |
| (VA) $LiPF_6$ | 1.0 | 1.0 | 1.0 | 1.0 | 1.0 |
| Discharge capacity | 100.0 | 101.5 | 100.8 | 100.1 | 98.2 |
| Load characteristic (%) | 89.8 | 89.3 | 75.0 | 87.6 | 91.3 |
| Cycle characteristic (%) | 72.5 | 86.0 | 81.0 | 71.0 | 74.5 |

The results given in Tables 1 to 3 demonstrate that the addition of 1,1-ditrifluoromethylethylene carbonate provides a better discharge capacity, load characteristic, and cycle characteristic than in Comparative Example 1, which lacked 1,1-ditrifluoromethylethylene carbonate. These results also demonstrate that larger effects are obtained for the discharge capacity, load characteristic, and cycle characteristic than with the monofluoroethylene carbonate of Comparative Example 2 and the difluoroethylene carbonate of Comparative Example 3.

Major effects on the discharge capacity, load characteristic, and cycle characteristic are also demonstrated for different electrolyte salts (Examples 9 to 11). While the discharge capacity, load characteristic, and cycle characteristic are reduced when the quantity of incorporation of the 1,1-ditrifluoromethylethylene carbonate is as low as 0.1 volume % (Example 12) or as high as 30 volume % (Example 13), the discharge capacity, load characteristic, and cycle characteristic are still seen to be improved in these instances over Comparative Example 1 and Comparative Example 4, in which 31 volume % is incorporated. The negative electrode does not become coated when the quantity of addition is too small, and there is then little effect on the cycle characteristic and so forth. When the quantity of addition is too large, the negative electrode does get coated, but a thick coating film is then present, and it is thought that this impairs lithium ion transfer at the interface, which results in a deterioration in the load characteristic.

In the case of the addition of the structural isomer 1,2-ditrifluoromethylethylene carbonate (Comparative Example 5), it may be understood that, due to the high reductive decomposition potential, decomposition products make up the coating film, the resistance is raised, and the load characteristic is then degraded.

The invention claimed is:

1. A solvent for a nonaqueous electrolyte solution for a lithium secondary battery,
the solvent containing a fluorine-free cyclic carbonate (I), a fluorine-free chain carbonate (II), and a 1,1-di(fluorinated alkyl)ethylene carbonate (III), and
wherein with a sum of (I), (II), and (III) being 100 volume %, the fluorine-free cyclic carbonate (I) is 10 to 50 volume %, the fluorine-free chain carbonate (II) is 49.9 to 89.9 volume %, and the 1,1-di(fluorinated alkyl)ethylene carbonate (III) is from at least 0.1 volume % to not more than 30 volume %.

2. The solvent for a nonaqueous electrolyte solution according to claim 1, wherein the fluorine-free cyclic carbonate (I) is ethylene carbonate, propylene carbonate, or a mixture thereof.

3. The solvent for a nonaqueous electrolyte solution according to claim 1, wherein the fluorine-free chain carbonate (II) is at least one selection from the group consisting of dimethyl carbonate, methyl ethyl carbonate, and diethyl carbonate.

4. The solvent for a nonaqueous electrolyte solution according to claim 1, wherein the water content of the 1,1-di(fluorinated alkyl)ethylene carbonate (III) is not more than 40 ppm.

5. The solvent for a nonaqueous electrolyte solution according to claim 1, wherein the 1,1-di(fluorinated alkyl) ethylene carbonate (III) is 1,1-di(trifluoromethyl)ethylene carbonate.

6. The solvent for a nonaqueous electrolyte solution according to claim 1, wherein with the sum of (I), (II), and (III) being 100 volume %, the fluorine-free cyclic carbonate (I) is 10 to 40 volume %, the fluorine-free chain carbonate (II) is 59.9 to 89.9 volume %, and the 1,1-di(fluorinated alkyl) ethylene carbonate (III) is from at least 0.1 volume % to not more than 10 volume %.

7. A nonaqueous electrolyte solution for a lithium secondary battery, comprising an electrolyte salt and the solvent for a nonaqueous electrolyte solution according to claim 1.

8. A lithium secondary battery that uses the nonaqueous electrolyte solution according to claim 7.

* * * * *